US005608481A

United States Patent [19]

Nishimura

[11] Patent Number: 5,608,481

[45] Date of Patent: Mar. 4, 1997

[54] SPRING STRUCTURE FOR PRESSURE PLATE OF PHOTOGRAPHIC CAMERA

[75] Inventor: Syunji Nishimura, Ohmiya, Japan

[73] Assignee: Fuji Photo Optical Co., Ltd., Saitama-ken, Japan

[21] Appl. No.: 402,610

[22] Filed: Mar. 13, 1995

[30] Foreign Application Priority Data

Jun. 23, 1994 [JP] Japan .................................... 6-141342

[51] Int. Cl.$^6$ .................................... G03B 17/00

[52] U.S. Cl. .................................... 396/440

[58] Field of Search .................................... 354/203, 288, 354/475

[56] References Cited

U.S. PATENT DOCUMENTS 5,075,704 12/1991 Yamamoto et al. .................... 354/203

FOREIGN PATENT DOCUMENTS 2-63041 2/1990 Japan .

*Primary Examiner*—David M. Gray

*Attorney, Agent, or Firm*—Brumbaugh, Graves, Donohue & Raymond

[57] ABSTRACT

A photographic camera has a camera back body on which are mounted an electronic circuit assembly including an external display system and the like and a pressure plate which is movable in the direction of the optical axis of a taking lens of the camera and supports the back side of a film loaded in the camera. A spring structure for urging the pressure plate toward the film includes a pair of torsion springs each having a linear shaft portion and a plurality of abutment portions extending substantially perpendicular to the shaft portion. The springs are disposed between the pressure plate and the camera back body so that the shaft portions of the respective torsion springs extend along opposite side edges of the pressure plate and a part of the abutment portions abuts against the pressure plate with the other abutment portions in abutment against a fixed portion on the camera back body. The shaft portions and the abutment portions of the respective torsion springs are disposed in spaces on opposite sides of the electronic circuit assembly without interference with the electronic circuit assembly.

3 Claims, 4 Drawing Sheets

10 11 25 21 25 11 20 20 14 14c 12 12b 19 18 19 15 12a 14a 12c 14b 17 16 15b 12a 13

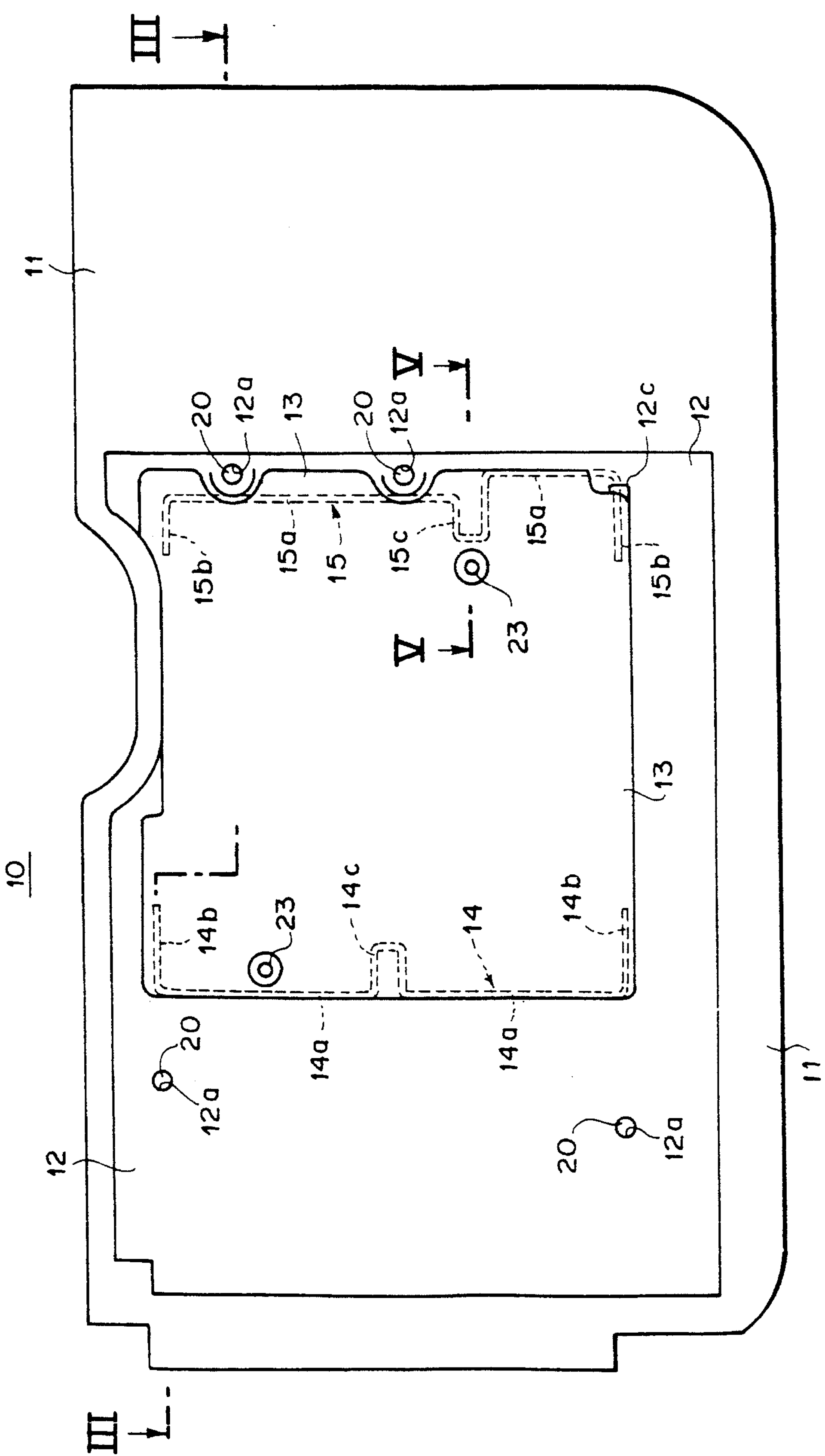
F I G.1
10
11
12
12a
12c
13
14
14a
14b
14c
15
15a
15b
15c
20
23
III
V

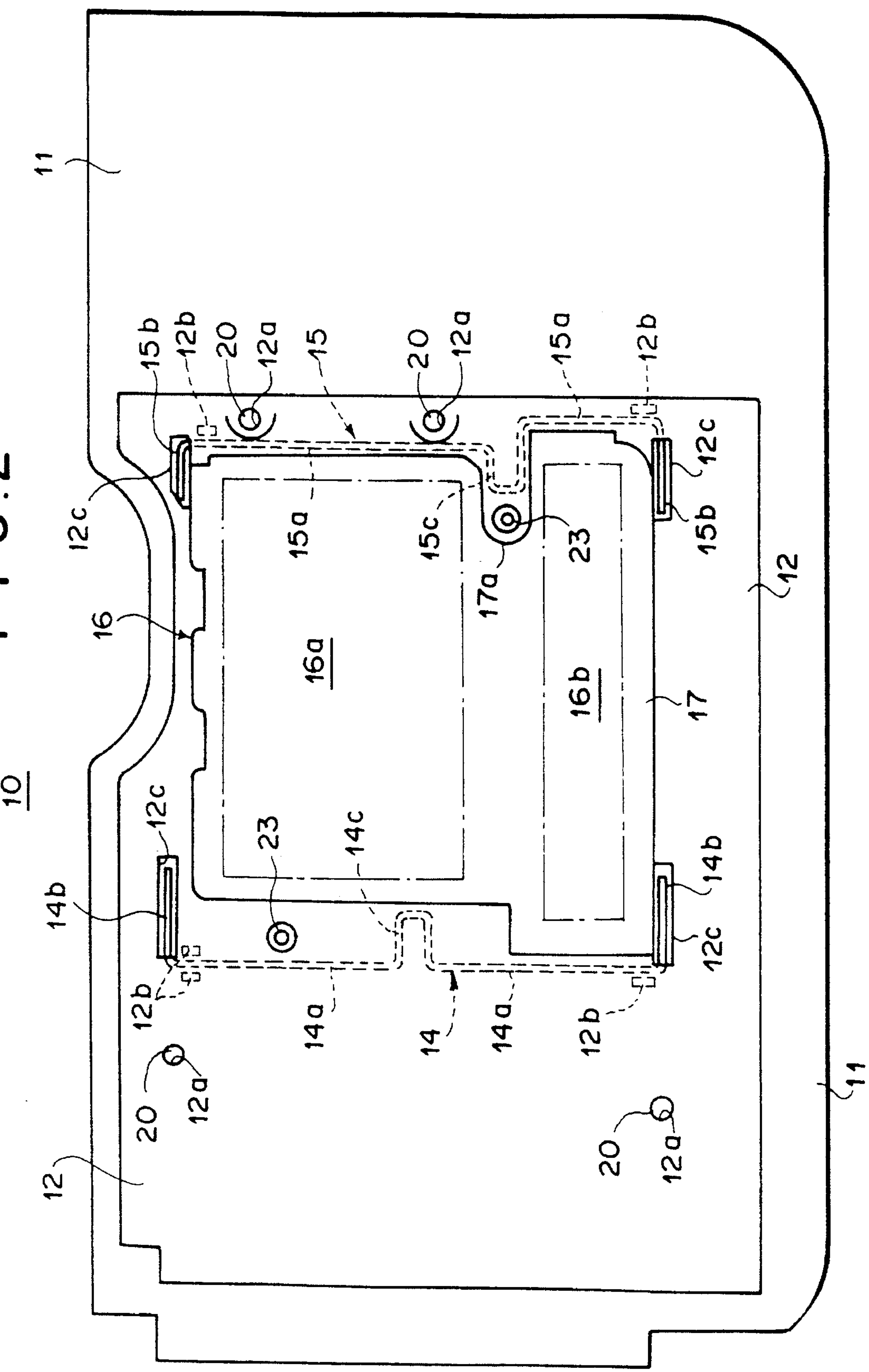
F I G. 2
10
11
12
12a
12b
12c
14
14a
14b
14c
15
15a
15b
15c
16
16a
16b
17
17a
20
23

10
11
25
20
21
20
25
11
12a
15
19
15b
16
18
17
19
14b
14c
12c
14
12b
14a
12a
12
13

SPRING STRUCTURE FOR PRESSURE PLATE OF PHOTOGRAPHIC CAMERA

BACKGROUND OF THE INVENTION

1. Field of the Invention

This invention relates to a spring structure for a pressure plate of a photographic camera for urging toward a film the pressure plate which is mounted on a camera back to be movable in the direction of the optical axis of the taking lens of the camera.

2. Description of the Prior Art

There has been known a spring structure for a pressure plate of a photographic camera in which the pressure plate is urged by a plate spring member interposed between the pressure plate and the camera back body.

There also has been known a spring structure for a pressure plate of a photographic camera in which the pressure plate is urged by a plurality of compression coil springs interposed between the pressure plate and the camera back body to extend in the direction of the optical axis of the taking lens of the camera.

Recently electronic circuit parts, switches, external displays or the like such as for recording date or the like has come to be disposed on the camera back.

In the former spring structure, a space corresponding to the thickness of the plate spring member plus a margin for permitting deformation of the plate spring member is necessary substantially over the entire area of the pressure plate, which adds to the size from the film surface to the outer surface of the camera back and obstructs miniaturization of the camera body.

Also in the latter spring structure, a space corresponding to the length of the coil springs is necessary in the direction of the optical axis and a space corresponding to the diameters of the coil springs is necessary in the direction perpendicular to the optical axis. It also obstructs miniaturization of the camera body.

Especially, in the case of a camera back where electronic circuit parts, switches, external displays or the like such as for recording date or the like are disposed, the plate spring member or the coil springs are arranged on the camera back together with those parts, which makes further difficult miniaturization of the camera body and can deteriorate appearance of the camera body.

SUMMARY OF THE INVENTION

In view of the foregoing observations and description, the primary object of the present invention is to provide a spring structure for the pressure plate which permits better use of the space in the camera back by compactly arranging the pressure plate spring with respect to the electronic circuit parts and the like disposed on the camera back.

The spring structure for urging the pressure plate toward the film in accordance with the present invention comprises a pair of torsion springs each having a linear shaft portion and a plurality of abutment portions extending substantially perpendicular to the shaft portion are disposed between the pressure plate and the camera back body so that the shaft portions of the respective torsion springs extend along opposite side edges of the pressure plate and a part of the abutment portions abuts against the pressure plate with the other abutment portions in abutment against a fixed portion on the camera back body. The shaft portions and the abutment portions of the respective torsion springs are disposed in spaces on opposite sides of the electronic circuit assembly without interference with the electronic circuit assembly.

Preferably each of said torsion springs has a pair of first abutment portions formed on opposite ends of the shaft portion and a second abutment portion formed on an intermediate portion of the shaft portion and the first abutment portions are in abutment against the rear side of the pressure plate at corners of the same with the second abutment portion being in abutment against the camera back body. In one embodiment, a holding plate for supporting the electronic circuit assembly is provided between the pressure plate and the camera back body and is fixed to the camera back body and the pressure plate is supported on the holding plate to be movable in the direction of the optical axis. In this case, the shaft portion of each of the torsion springs is interposed between the holding plate and the camera back body and the first abutment portions are in abutment against the rear side of the pressure plate through openings formed in the holding plate.

Since being linear torsion springs, the pressure plate springs can be designed with a high degree of freedom and the shape of the springs and the positions of the abutment portions to abut against the camera back body can be selected according to the shape of the electronic circuit assembly not to overlap with the electronic circuit assembly in the direction of thickness of the camera back body. Accordingly the pressure plate springs can be disposed in dead spaces on opposite sides of the electronic circuit assembly, whereby the pressure plate springs can be arranged on the camera back body without increasing the size of the camera back body and freedom in designing the outer appearance of the camera can be obtained.

When each of said torsion springs has a pair of first abutment portions to be brought into abutment against the rear side of the pressure plate at corners of the same and a second abutment portion to be brought into abutment against the camera back body, the pressure plate can be evenly urged and at the same time interference with the electronic circuit assembly can be easily prevented by virtue of freedom in the position of the second abutment portion.

BRIEF DESCRIPTION OF THE DRAWINGS

FIG. 1 is a front view of a camera back provided with a pressure plate spring structure in accordance with an embodiment of the present invention, FIG. 2 is a front view of the camera back with the pressure plate removed.

DESCRIPTION OF THE PREFERRED EMBODIMENT

Figure 3:
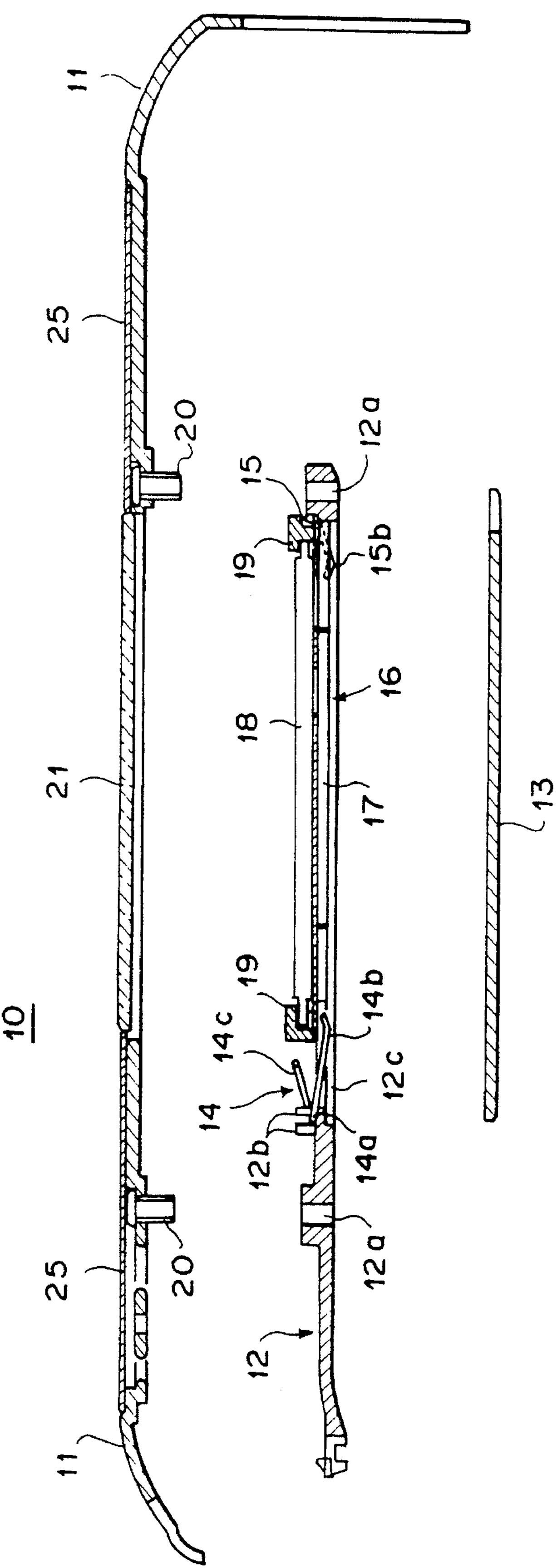
FIG. 3 is an exploded cross-sectional view taken along line III—III in FIG. 1.

In FIGS. 1 to 5, a camera back 10 comprises a camera back body 11 which forms back cover of the camera, a holding plate 12 for holding an electronic circuit assembly 16 including various electronic elements such as a date module, a pressure plate 13 for pressing the rear side of a film (not shown), and a pair of pressure plate springs 14 and 15 which urges the pressure plate 13 toward the film.

Figure 4:
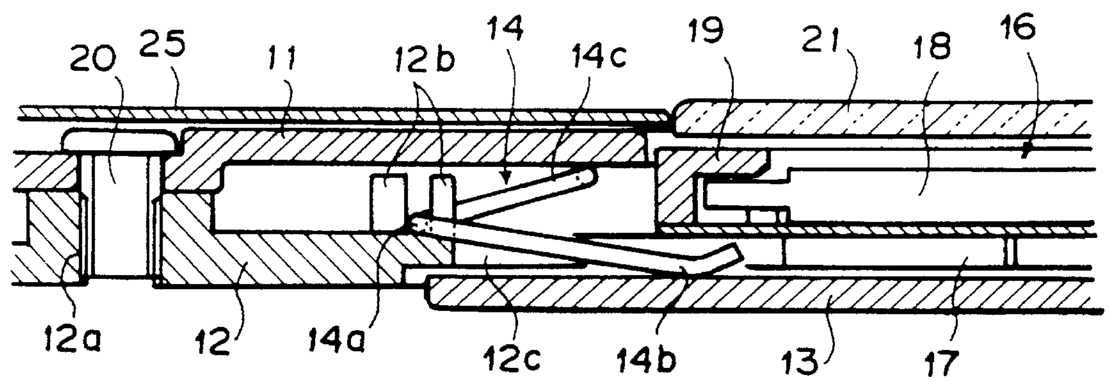
FIG. 4 is a fragmentary cross-sectional view taken along line III—III in FIG. 1.

The electronic circuit assembly 16 includes an external display portion 16*a* and a switch portion 16*b* disposed below the external display portion 16*a* as shown in FIG. 2. Various elements such as an LCD (liquid crystal display) panel 18 are mounted on a circuit board 17 (FIGS. 3 and 4).

The holding plate 12 extends to cover the central portion and one end portion of the camera back body 11 and is provided with an opening in a portion opposed to the central portion of the camera back body 11. The circuit board 17 carrying thereon the LCD panel 18 and the like is disposed in the opening so that the external display portion 16*a* is disposed above the switch portion 16*b*. The LCD panel 18 in the external display portion 16*a* displays various information and the switch portion 16*b* includes setting buttons and the like.

The holding plate 12 is fixed to the inner side of the camera back body 11 by four screws 20 which are screwed into threaded holes 12*a* in the holding plate 12. An opening is formed in the camera back body 11 in the upper portion of the central part thereof and a transparent plate is set in the opening to form a window 21. The LCD panel 18 held by a frame 19 is fixed in a position opposed to the window 21. Though not shown, holes through which the setting buttons and the like in the switch portion 16*b* extend outward are formed in the camera back body 11 in the lower portion of the central part thereof.

In the electronic circuit assembly 16, the switch portion 16*b* projects rightward beyond the right side end (as seen in FIG. 2) of the external display portion 16*a* and a cutaway portion 17*a* is formed in the circuit board 17 between the external display portion 16*a* and the switch portion 16*b* in the right side end thereof. Further the switch portion 16*b* projects leftward beyond the left side end of the external display portion 16*a* by distance larger that in the right side end.

Two of the screws 20 fixing the holding plate 12 to the camera back body 11 are disposed on the right of the external display portion 16*a* near the upper and lower ends thereof and the other two screws 20 are disposed on the left side of the external display portion 16*a* near the upper and lower ends of the holding plate 12. The threaded holes 12*a* of the holding plate 12 are respectively provided with bosses which extend toward the camera back body 11, whereby a space for accommodating the LCD panel 18 and the like are formed between the holding plate 12 and the camera back body 11.

Figure 5:
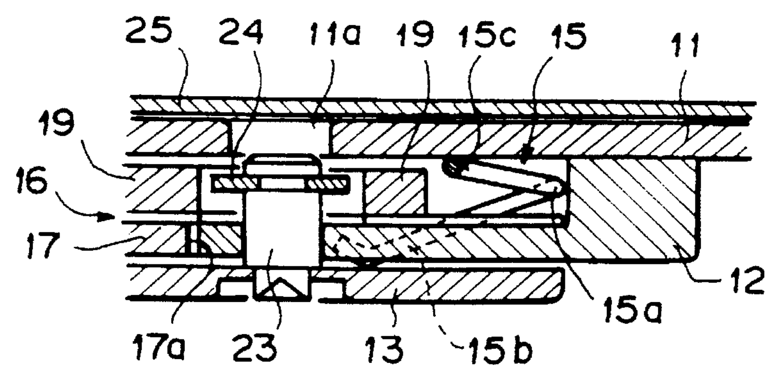
FIG. 5 is a fragmentary cross-sectional view taken along line V—V in FIG. 1.

The pressure plate 13 is substantially rectangular in shape and covers the whole electronic circuit assembly 16 and is supported by a left and right support pins 23 to be slightly movable in the direction of the optical axis of the taking lens (not shown). That is, as shown in FIG. 5, one ends of the support pins 23 are fixed to the pressure plate 13 and the other end portions of the support pins 23 are slidably passed through holes formed in the holding plate 12 with stopper rings 24 fitted on the other ends of the pins 23. Accordingly the pressure plate 13 can be moved in the direction of the optical axis between a position when the pressure plate 13 itself abuts against the holding plate 12 and a position where the stopper ring 24 abuts against the rear side of the holding plate 12.

A pair of holes 11*a* are formed in the camera back body 11 respectively in alignment with the pins 23. The right support pin 23 is disposed in the cutaway portion 17*a* of the circuit board 17 between the external display portion 16*a* and the switch portion 16*b* and the left support pin 23 is disposed near the external display portion 16*a*. A pair of nameplates 25 are bonded to the rear side of the camera back body 11 on opposite sides of the window 21 to cover the screws 20 and the pins 23.

The pressure plate 13 is urged forward or toward the film by a pair of linear torsion springs 14 and 15 which extend substantially in the vertical direction on opposite sides of the pressure plate 13, respectively.

The left side (as seen in FIGS. 1 and 2) spring 14 comprises upper and lower shaft portions 14*a* which extend in the vertical direction in alignment with each other, upper and lower first abutment portions 14*b* which extend rightward respectively from the upper and lower ends of the upper and lower shaft portions 14*a* and a second abutment portion 14*c* which extends rightward between the upper and lower shaft portions 14*a*. The upper and lower shaft portions 14*a* are substantially equal to each other in length and the second abutment portion 14*c* is at the middle of the left side spring 14. The first abutment portions 14*b* are twisted toward the pressure plate 13 relative to the shaft portions 14*a* and the second abutment portion 14*c* is twisted toward the camera back body 11 relative to the shaft portions 14*a* as clearly shown in FIG. 4.

The right side spring 15 comprises upper and lower shaft portions 15*a* which extend in the vertical direction, upper and lower first abutment portions 15*b* which extend leftward respectively from the upper and lower ends of the upper and lower shaft portions 15*a* and a second abutment portion 15*c* which extends leftward between the upper and lower shaft portions 15*a*. The upper shaft portion 15*a* is longer than the lower shaft portion 15*a* and the second abutment portion 15*c* is in the lower portion of the right side spring 15. The first abutment portions 15*b* are twisted toward the pressure plate 13 relative to the shaft portions 15*a* and the second abutment portion 15*c* is twisted toward the camera back body 11 relative to the shaft portions 15*a* as clearly shown in FIG. 5. The upper shaft portion 15*a* extends inside the screws 20 out of alignment with the lower shaft portion 15*a* to clear the screws 20, and the second abutment portion 15*c* disposed opposed to the cutaway portion 17*a* in the circuit board 17.

Retainer projections 12*b* are formed on the rear side of the holding plate 12 in four positions along the side edges of the pressure plate 13 near the four corners thereof and four slits 12*c* are formed in the holding plate 12 to extend along the upper and lower edges of the pressure plate 13 near the four corners thereof. The left side spring 14 and the right side spring 15 are interposed between the holding plate 12 and camera back body 11 with the shaft portions 14*a* and 15*a* positioned between the retainer projections 12*b* or inside the same and the first and second abutment portions 14*b*, 15*b* and 14*c*, 15*c* compressed between the holding plate 12 and camera back body 11 so that the angles between the first abutment portions 14*b* and the second abutment portion 14*c* and between the first abutment portions 15*b* and the second abutment portion 15*c* are narrowed (FIG. 4 or 5). In this state, the end portions of the first abutment portions 14*b* and 15*b* are pressed against the rear side of the pressure plate 13 through the slits 2*c* in the holding plate 12 and the second abutment portions 14*c* and 15*c* are pressed against the inner or front side of the camera back body 11.

With this arrangement, the torsion springs 14 and 15 urge the pressure plate 13 away from the holding plate 12 at the four corners of the pressure plate 13 under their torsional stress. Further the springs 14 and 15 are positioned on the side edge portions of the holding plate 12 where they do not overlap with the electronic circuit assembly 16 in the direction of the optical axis and in dead spaces between the camera back body 11 and the holding plate 12. Accordingly, the springs 14 and 15 do not add to the distance between the pressure plate 13 and the inner side of the camera back body 11. Especially, disposition and the shape of the shaft portions 14*a* and 15*a* and the abutment portions 14*b*, 15*b*, 14*c* and 15*c* can be designed with a high degree of freedom, which makes it feasible to compactly arrange the springs 14 and 15 having a predetermined resiliency without interference with the screws 20, the electronic circuit assembly 16 and the like.

As can be understood from the description above, by urging the pressure plate with pressure plate springs in the form of torsion springs which have the abutment portions extending substantially perpendicular to the shaft portions and are disposed between the camera back body and the pressure plate on opposite sides of the pressure plate in spaces on opposite sides of the electronic circuit assembly mounted on the camera back body, the pressure plate springs can be designed with a high degree of freedom according to the shape of the electronic circuit assembly. Accordingly the pressure plate springs can be disposed in dead spaces on opposite sides of the electronic circuit assembly, whereby the pressure plate springs can be arranged on the camera back body without increasing the size of the camera back body.

What is claimed is:

1. In a photographic camera having a camera back body on which are mounted an electronic circuit assembly including an external display system and a pressure plate which is movable in the direction of the optical axis of a taking lens of the camera and supports the back side of a film loaded in the camera, a spring structure for urging the pressure plate toward the film comprising a pair of torsion springs each having a linear shaft portion and a plurality of abutment portions extending substantially perpendicular to the shaft portion disposed between the pressure plate and the camera back body so that the shaft portions of the respective torsion springs extend along opposite side edges of the pressure plate and a part of the abutment portions abuts against the pressure plate with the other abutment portions in abutment against a fixed portion on the camera back body, the shaft portions and the abutment portions of the respective torsion springs being disposed in spaces on opposite sides of the electronic circuit assembly without interference with the electronic circuit assembly.

2. A spring structure as defined in claim 1 in which each of said torsion springs has a pair of first abutment portions formed on opposite ends of the shaft portion and a second abutment portion formed on an intermediate portion of the shaft portion, the first abutment portions being in abutment against the rear side of the pressure plate at corners of the same and the second abutment portion being in abutment against the camera back body.

3. A spring structure as defined in claim 2 in which a holding plate for supporting the electronic circuit assembly is provided between the pressure plate and the camera back body and is fixed to the camera back body and the pressure plate is supported on the holding plate to be movable in the direction of the optical axis, the shaft portion of each of the torsion springs being interposed between the holding plate and the camera back body and the first abutment portions being in abutment against the rear side of the pressure plate through openings formed in the holding plate.

* * * * *